United States Patent [19]
Ryu

[11] Patent Number: 5,898,880
[45] Date of Patent: Apr. 27, 1999

[54] POWER SAVING APPARATUS FOR HARD DISK DRIVE AND METHOD OF CONTROLLING THE SAME

[75] Inventor: Chang-Hyun Ryu, Kyungi-do, Rep. of Korea

[73] Assignee: SamSung Electronics Co., Ltd., Suwon, Rep. of Korea

[21] Appl. No.: 08/816,711

[22] Filed: Mar. 13, 1997

[30] Foreign Application Priority Data

Mar. 13, 1996 [KR] Rep. of Korea .......................... 96-6642

[51] Int. Cl.$^6$ ...................................................... G06F 13/00
[52] U.S. Cl. ................................ 395/750.05; 395/750.06; 395/750.08; 367/707
[58] Field of Search ........................ 395/750.05, 750.08, 395/750.06; 364/707; 360/75

[56] References Cited

U.S. PATENT DOCUMENTS

| | | | |
|---|---|---|---|
| 4,907,183 | 3/1990 | Tanaka .................................. | 395/750.08 |
| 5,339,446 | 8/1994 | Yamasaki et al. .................. | 395/750.08 |
| 5,408,369 | 4/1995 | Miura et al. ............................. | 360/75 |
| 5,452,277 | 9/1995 | Bajorek et al. ..................... | 395/750.08 |
| 5,481,733 | 1/1996 | Douglis et al. .................... | 395/750.06 |
| 5,493,670 | 2/1996 | Douglis et al. .................... | 395/750.06 |
| 5,517,649 | 5/1996 | McLean .............................. | 395/750.05 |
| 5,535,400 | 7/1996 | Belmont ............................. | 395/750.07 |
| 5,574,920 | 11/1996 | Parry .................................. | 395/750.08 |

*Primary Examiner*—Meng-Ai T. An
*Assistant Examiner*—Rupal D. Dharia
*Attorney, Agent, or Firm*—Robert E. Bushnell, Esq.

[57] ABSTRACT

The present invention relates to a power saving apparatus for a hard disk drive in a battery powered computer and to a method of controlling the same in the battery powered computer. CPU of the power saving apparatus is configured to generate a request signal for receiving battery level data from a power control unit, to enable a disk cache to operate in a write back mode if the battery level is available for a predetermined time period, and to control the power control unit to produce a switch off signal after writing all data contained in the cache into the hard disk is completed in response to a power off system management interrupt signal from the power control unit. With this configuration, access to the hard disk drive is restricted and power consumption of hard disk drive is reduced without the loss of data in the cache when there is a sudden system power off.

20 Claims, 4 Drawing Sheets

POWER SAVING APPARATUS FOR HARD DISK DRIVE AND METHOD OF CONTROLLING THE SAME

CLAIM FOR PRIORITY

This application makes reference to, incorporates the same herein, and claims all benefits accruing under 35 U.S.C. §119 from an application for *Power Saving Apparatus For Hard Disk Drive And Method Of Controlling The Same* earlier filed in the Korean Industrial Property Office on Mar. 11, 1996 and there duly assigned Ser. No. 96-6642.

BACKGROUND OF THE INVENTION

1. Technical Field

The present invention relates to disk drives for computers, and more particularly, relates to a power saving apparatus for hard disk drives used in such computers and a power management method for enabling a hard disk cache to operate in a write back mode and restricting access to hard disk drive in order to reduce battery power consumption.

2. Related Art

Most computers in use today includes a hard disk drive which is a random access memory device containing a magnetic head, a motor and one or more disks that store information. The motor turns a disk underneath the magnetic head. The disk contains electrically encoded data that is detected by the magnetic head as the head passes over the disk. The disk can be read from during a read operation or written to during a write operation of the hard disk drive as the magnetic head is moved along a radius of the disk and the disk spins under the magnetic disk.

Unfortunately, constantly spinning the disk in the hard disk drive consumes a large amount of power. Specifically, a motor must be devoted to spinning the disk to allow access to the full physical array of data on the disk. Powering a mechanical device such as a motor consumes a significant amount of power relative to the power consumed by the electronic circuitry within a computer. Consequently, it has become highly desirable to reduce the hard disk power consumption in order to maximize the energy efficiency, particularly when the computers use a rechargeable battery as a power source.

One power management technique commonly used in portable computers is turning off the hard disk drive motor when the hard disk drive has not been used recently. There are several methods of turning off the hard disk drive motor while leaving the remainder of the computer circuitry on. Many computers include a "sleep" button for allowing the user to power down the hard disk drive motor without powering down the entire computer in order to conserve battery power that would otherwise be wasted when the hard disk drive is not being accessed. Other methods of powering down the hard disk drive include programming a Basic Input/Output System (BIOS) driver to power down the hard disk drive after the passage of a predetermined time period during which the hard disk drive has not been accessed. Other adaptive power management techniques for hard disk drives are disclosed, for example, in U.S. Pat. No. 5,574,920 for *Method For Controlling Power Down Of A Hard Disk Drive In A Computer* issued to Parry, U.S. Pat. No. 5,535,400 for SCSI Disk Drive Power Down Apparatus issued to Belmont, U.S. Pat. No. 5,517,649 for *Adaptive Power Management For Hard Disk Drives* issued to McLean, U.S. Pat. No. 5,493,670 for *Adaptive Disk SPN-Down Method For Managing The Power Distributed To A Disk Drive In A Laptop Computer* issued to Douglis et al., U.S. Pat. No. 5,481,733 for *Method For Managing The Power Distributed To A Disk Drive In A Laptop Computer* issued to Douglis et al., U.S. Pat. No. 5,452,277 for *Adaptive System For Optimizing Disk Drive Power Consumption* issued to Bajorek et al., and U.S. Pat. No. 5,408,369 for *Power Saving System For Rotating Disk Data Storing Apparatus* issued to Miura et al. However, none of the conventional power management techniques addresses the balance between reduced power consumption and prevention of loss data to the sudden system power off.

Recent advances in portable computers in which an operating voltage of integrated devices is reduced from 5Volts to less than 3Volts use advanced power management (APM) system to facilitate suspending and resuming the system in order to minimize power consumption during its use. One example of such an APM system is disclosed in U.S. Pat. No. 5,560,023 for *Automatic Backup System For Advanced Power Management* issued to Crump et al., in which an automatic backup suspend system is also provided to benefit from the APM but with greater reliability.

Generally, the APM system has the following features: First, it lowers a system clock frequency when a computer system is not in use for a predetermined time period after access has been made to the computer system. Secondly, it automatically shuts off power supply to a display monitor when there is no activity in a keyboard or mouse for a predetermined time period. Finally, it suspends motor drive operation in hard disk drive if no access has been made to the hard disk drive for a predetermined time period. This power management scheme is based on shutting off power supply directed to the energy consuming parts or peripheral of the computer system, if the computer system is inactive for a predetermined time period. The power saving feature is particularly useful to battery powered computer systems using LCD display panels such as laptop and notebook computers, where most of the power consumption is attributed to hard disk drive operation. When the APM system is implemented for the hard disk drive in such portable computers, however, there is a frequent occurrence of the on/off of the driving motor of hard disk drive because of disk buffer cache operation provided between the hard disk and the system main memory.

Conventionally, the disk cache adapted its control algorithm to the well known write through mode to maintain cache coherency and to prevent loss of data at the sudden system power off. The write through mode cache operates such that every time there is a change of data in the cache, the APM system operates the hard disk drive to write the change into the hard disk. Even when the hard disk drive is in the power saving (i.e., standby) mode which turns off the hard disk drive motor, if data in the cache has changed, the motor is still driven to perform the write operation for the changed data. It has been my observation that the frequent power on/off of the hard disk drive motor will cause excessive battery consumption, and under some circumstance it will lead to the worst case that the power saving cannot be realized at all. Furthermore, when the motor is driven, there is a waiting period for the motor to arrive at the normal revolution speed, and this waiting period will lower the system performance.

SUMMARY OF THE INVENTION

Accordingly, it is therefore an object of the present invention to provide a new and improved power saving apparatus for hard disk drive in battery powered computers.

It is also an object to provide a power saving apparatus for hard disk drive that can effectively reduce power consumption in the hard disk drive by using write back mode as disk cache control algorithm, and enhances read/write performance of hard disk drive.

These and other objects of the present invention can be achieved by a power saving apparatus for a hard disk drive in a computer system which includes a power supply unit for supplying various level of voltages necessary for the computer system from one of a power outlet and a battery, and for generating a battery voltage level signal corresponding to a voltage level of the battery; a first power switch positioned on the computer system, for producing one of a power on signal and a power off signal in response to manual depression of the first power switch; a second power switch for enabling transmission of output voltages of the power supply unit in response to a switch control signal; a power supply control unit for generating battery level data by converting the battery voltage level signal, for generating the switch control signal supplied to the second power switch upon receipt of the power on signal input from the first power switch, for generating a power off system management interrupt (SMI) signal upon receipt of the power off signal input from the first power switch, and for generating a battery eject system management interrupt (SMI) signal when the battery is ejected from the computer system; a central processing unit for generating a request signal to receive the battery level data from the power supply control means, for enabling a disk cache to operate in a write back mode when the battery level data indicates that the battery is available for a predetermined time period, and controlling the power supply control unit to generate a switch off signal after writing all data in the disk cache into a hard disk is completed in response to the power off system management interrupt (SMI) signal from the power supply control unit; and a hard disk drive supplied with one output voltage of the power supply unit and operated in one of a write through cache and a write back cache mode under control of the central processing unit.

As contemplated by the present invention, a method for controlling a power saving apparatus to access to hard disk drive includes determining whether a system management interrupt signal is invoked; determining whether an invoked system management interrupt signal corresponds a battery level check signal for detecting a charging level of the battery; when the invoked system management interrupt signal corresponds the battery level check signal, enabling a cache in the hard disk drive to operate in the write back mode; when the invoked system management interrupt signal does not correspond the battery level check signal, determining whether the invoked system management interrupt signal corresponds the power off system management interrupt signal; when the invoked system management interrupt signal corresponds the power off system management interrupt signal, enabling the hard disk drive to write all data contained in the cache into the hard disk; and switching off power supplied to the computer system. According to the present invention, when computer system is operated with battery power, the hard disk cache is allowed to be controlled in a write back mode. Upon receipt of power off or reset of the computer system, all data existed in the disk cache is first written into the hard disk drive in order to prevent loss of data contained in the disk cache occurred during sudden disruption of power while effectively reducing power consumption of the hard disk drive.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
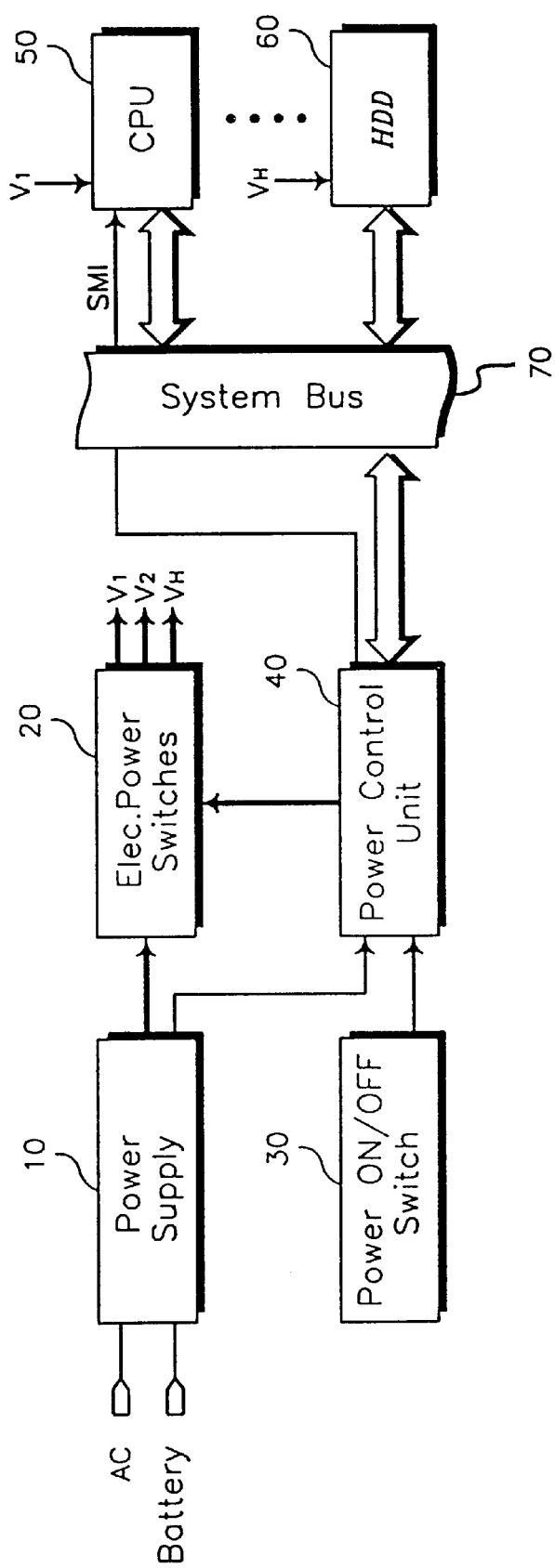
FIG. 1 is a block diagram of a power saving apparatus constructed according to the principles of the present invention.
Figure 2:
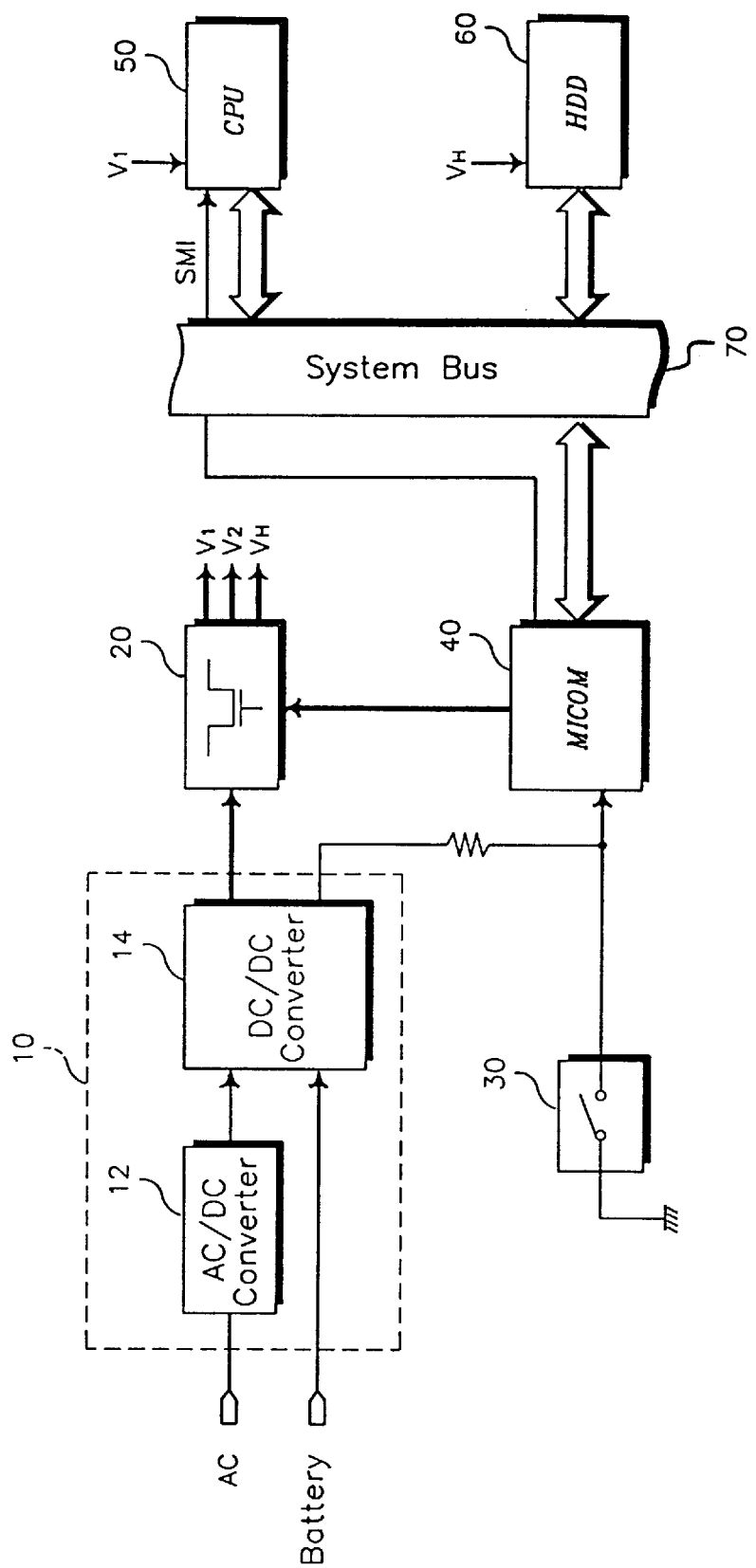
FIG. 2 illustrates detailed circuitry of the power saving apparatus as shown in FIG. 1.

Referring now to the drawings and particularly to FIGS. 1 and 2, which illustrate a power saving apparatus constructed according to the principles of the present invention. The power saving apparatus is configured to control hard disk drive by using a write back mode disk cache that reduces the number of time in which the hard disk drive is accessed in order to reduce the power consumption of battery by the hard disk drive. Usually, the write back mode allows the disk cache to operate such that once data contained in the cache has changed, the changed data remains in the cache and the data may not be written onto the hard disk. Meanwhile, if such data is not found in the cache, that is, the miss hit occurs, then all the changed data is written on the hard disk media while an access to the hard disk is performed to find necessary data.

The present invention is to provide a power saving apparatus for hard disk drive, which enables disk cache to operate in a write back mode, so that it restricts hard disk access as much as possible, without having lost of data in the cache when a sudden system power off has occurred. In addition, the present invention also provides a method for controlling such a power saving apparatus for the hard disk drive.

As shown in FIGS. 1 and 2, the power saving apparatus according to the present invention includes a power supply unit 10, an electronic power switch 20, a power ON/OFF switch 30, a power control unit 40, and a computer system including a central processing unit (CPU) 50, a hard disk drive (HDD) 60, and a main memory which is typically a DRAM (not shown) etc. The power control unit 40 is preferably consisted of one chip microcomputer and is connected to the CPU unit 50 via a system bus 70. The CPU 50 is connected to the HDD 60 and the main memory via the system bus 70.

The power supply unit 10 includes an AC/DC converter 12 and a DC/DC converter 14 connected to an AC power inlet and a battery, respectively. The output of the DC/DC converter 14 that produces various level of voltages necessary for operation of the computer system is connected with the respective electronic circuitry of the computer system via the electronic power switch 20. The power supply unit 10 also has an output terminal that is connected to one input terminal of the power control unit 40 to supply a voltage level signal corresponding to the present voltage level of the battery.

The electronic power switch 20 is consisted of a plurality of power field-effect transistors (FETs) each serving as a discrete switch, and each switch is turned on or off in response to the control signal output from the power control unit 40. The power ON/OFF switch 30, commonly hand-operated, is provided between a DC level output of the power supply unit 10 and the ground. The level detect output is connected to another input of the power control unit 40, to detect the turning on or off the power ON/OFF switch 30 and to provide a power on or off signal to the power control unit 40. Thus, the power control unit 40 receives the battery voltage level signal from the power supply unit 10 and the power on/off signal from the switch 30. The detected battery level signal is then converted into battery data for the power control unit 40 to transmit the data representing the battery voltage level to the CPU 50 in response to the request from the CPU 50.

Upon receipt of the power on signal from the power ON/OFF switch 30, the power control unit 40 generates several control signals to the electronic power switch 20 for controlling operation of each discrete switch contained therein. Alternatively, upon receipt of the power off signal from the power ON/OFF switch 30, the power control unit 40 reads out a power off system management interrupt (SMI) signal from an SMI memory and sends the same to the CPU 50. Additionally, when the battery is separated or ejected from the computer system and the power supply unit 10 is not supplied with the battery power, the power control unit 40 sends a battery eject SMI signal to the CPU 50 to alert the CPU 50 of such ejection.

The SMI signal is given the most priority among all interrupts in the computer system and is assigned for managing the power consumption of the computer system. The CPU 50 has a SMI signal input port in order to receive the SMI signal. Upon receipt of the SMI signal, the CPU 50 changes its operation mode to a SMM (System Management Mode) so as to execute a control program for managing computer system. Further, the CPU 50 produces a battery level check SMI signal for requesting the power control unit 40 to send the battery voltage level signal. Upon receipt of the battery level signal, the CPU 50 determines the present charging level of the battery and carries out control program routine responsive thereto. Also, upon receipt of the power off SMI signal, the CPU 50 executes a predetermined control program according to the present invention. As previously mentioned, the CPU 50 controls hard disk drive 60 by adapting write back mode disk cache to reduce power consumption in the hard disk drive and to enhance read/write performance thereof.

Figure 3:
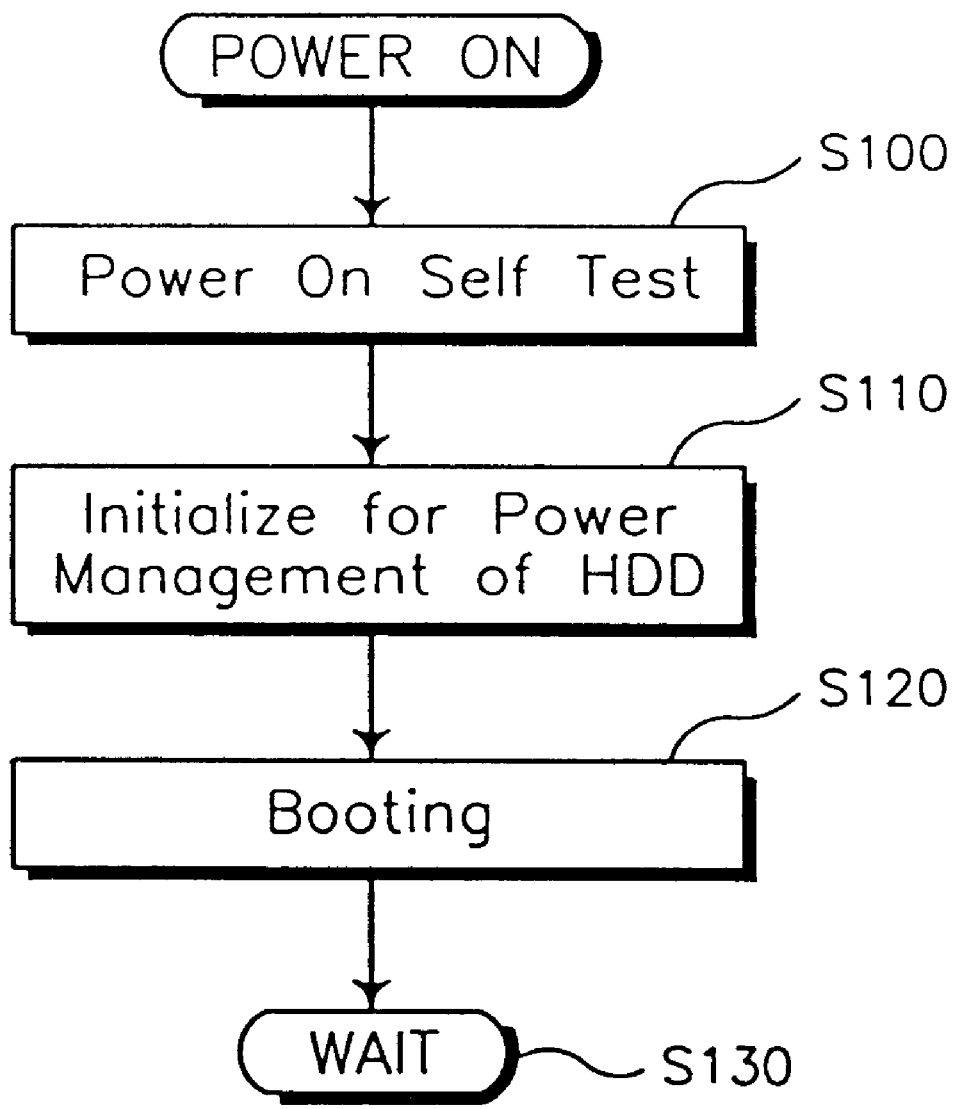
FIG. 3 is a flow chart illustrating initializing operation of a power saving apparatus constructed according to the principles of the present invention.

A control method of the power saving apparatus of the present invention will now be described in detail with reference to FIGS. 3 and 4. Turning now to FIG. 3 which shows an initializing program to be processed by the power saving apparatus when the power ON/OFF switch 30 is turned on. The power on signal generated from the power on/off switch 30 is fed to the power control unit 40 which, in turn, generates switching control signals to be supplied with each electronic power switch 20. Then, each discrete switches of the electronic power switch 20 is turned on and the necessary DC power V1, V2, . . . Vh are fed to each parts of the computer system. With this power on operation, the initializing program stored in a boot ROM is executed.

At step S100, a normal Power On Self Test is performed to check if the computer system is in normal or not. Next, in step S110, the power management of the HDD 60 is initialized. This initializing operation includes enabling of interrupt routine of the battery level check SMI, the power off SMI, and the battery eject SMI. After initializing of the hard disk management operation, normal computer booting operation is performed. Then, at step 130, the computer system enters into a wait state.

Figure 4:
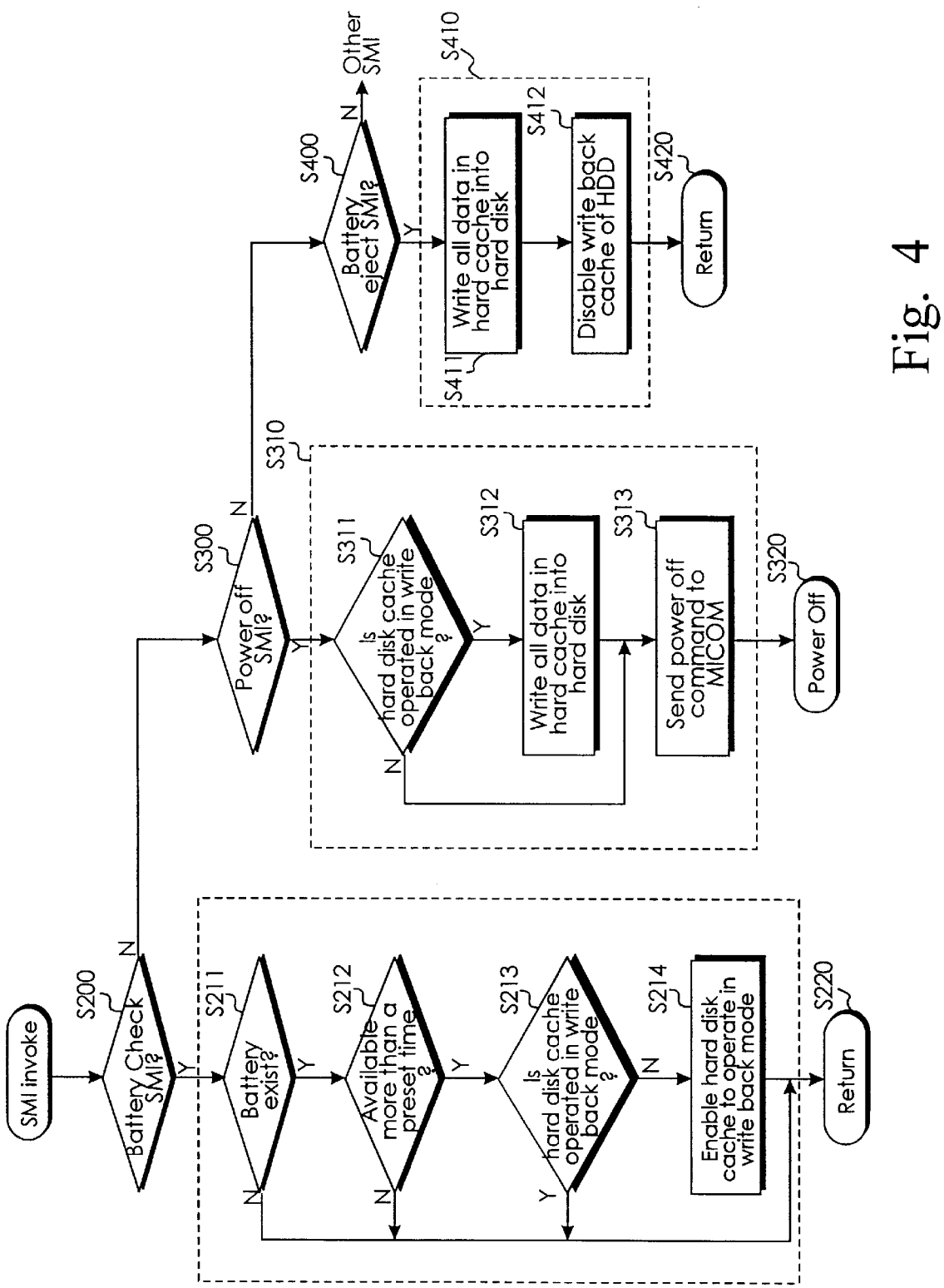
FIG. 4 is a flow chart illustrating control method of a power saving apparatus constructed according to the principles of the present invention.

FIG. 4 shows the control method of the power saving apparatus according to the present invention. When a SMI is invoked in the computer system, the CPU 50 is entered in a SMI mode at once and determines whether an invoked SMI corresponds to one of a battery check SMI, a power off SMI, a battery eject SMI and other SMI signals. If it is determined that the invoked SMI corresponds to a battery check SMI at step 200, the CPU 50 enables the hard disk cache to operate in a write back mode through a series of step 210 and returns to its original operation at step 220. In detail, step 210 includes determining the existence of a battery in the computer system at step 211, determining the availability of a battery usage time at step 212, and status of the hard disk cache at step 213 for enabling the HDD to operate in a write back mode at step 214. That is, if the existent battery is available more than one minute and the present hard disk cache is not in the write back mode, the CPU 50 issues a command that allows hard disk cache to turn to the desired write back mode.

When the invoked SMI is not the battery check SMI at step S200. The CPU 50 determines whether the invoked SMI corresponds to a power off SMI at step 300, that is the system power off has occurred. If the invoked SMI corresponds to the power off SMI at step 300, the CPU 50 enables the HDD to write all data existed in the hard disk cache into the hard disk if the HDD is operated in the write back mode through a series of step 310 and then power off operation is performed at step 320. In detail, step 310 includes determining whether the hard disk cache is operated in the write back mode at step 311, and writing of cache data contained in the hard disk cache into the hard disk at step 312. When the writing operation is completed or the cache is not in the write back mode, issuance of the power off command directed to the power control unit 40 is made at step 313.

When the invoked SMI is not the power off SMI at step S200, the CPU 50 determines whether the invoked SMI corresponds to a battery eject SMI at step 400. When the invoked SMI corresponds to the battery eject SMI at step 400, the CPU 50 enables the disk cache to write all data existed in the hard disk cache into the hard disk at step 411, disables the write back cache of the hard disk drive 60 at step 412, and then returns to its original operation at step 420.

As apparent from the foregoing, since the power saving apparatus of the present invention controls the hard disk cache by using write back mode, the number of times in which the hard disk is accessed can be considerably reduced in order to reduce the battery power consumption by the hard disk drive and thereby extending the available usage time of the battery. In addition, since the access to the hard disk is restricted, the hard disk read/write operation is reduced in order to enhance the system performance. Further, since remedy is provided to the sudden system power off such that the disk cache is allowed to write all data existed in the cache into the hard disk only if it is not operated in the write back mode and then power off operation is performed, the loss of data in the disk cache is effectively prevented.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof Therefore, it is intended that the present invention not be limited to the particular embodiment disclosed as the best mode contemplated for carrying out the present invention, but that the present invention includes all embodiments falling within the scope of the appended claims.

What is claimed is:

1. A power saving apparatus for a hard disk drive in a computer system, comprising:

a power supply unit for supplying various levels of voltages necessary for the computer system from one of a power outlet and a battery, and generating a battery voltage level signal corresponding to a voltage level of the battery;

a first power switch;

a second power switch for enabling transmission of output voltages of the power supply unit in response to a switch control signal;

a power supply control unit for generating battery level data in response to the battery voltage level signal, generating the switch control signal supplied to the second power switch when the first power switch is turned on, alternatively generating a power off system management interrupt signal when the first power switch is turned off, and for generating a battery eject system management interrupt signal when the battery is ejected from the computer system and the power supply unit is not supplied with the voltage level of the battery;

a central processing unit coupled to receive the battery level data for enabling a disk cache to operate in a write back mode when the battery level data indicates that the battery is available for a predetermined time period, and for controlling the power supply control unit to generate a switch off signal after writing all data in the disk cache into a hard disk is completed in response to the power off system management interrupt signal; and said hard disk drive supplied with one output voltage of the power supply unit for operation in one of a write through cache mode and a write back cache mode under the control of said central processing unit.

2. The power saving apparatus of claim 1, further comprised of the power supply unit comprising:

an AC/DC converter for transforming an alternating current received from said power outlet into a direct current output; and a DC/DC converter transforming one of the direct current output of the AC/DC converter and a battery power output from the battery into the various level of voltages.

3. The power saving apparatus of claim 1, further comprised of said second power switch comprising a plurality of power field-effect transistors each serving as a discrete switch, and each switch being turned on or off in response to the switch control signal output from the power control unit.

4. The power saving apparatus of claim 1, further comprised of said power supply control unit corresponding to an one chip microcomputer connected to said central processing unit via a system bus.

5. A method for controlling a power saving apparatus for a hard disk drive in a computer system, comprising the step of:

providing power supply to said computer system comprising a power supply unit for supplying DC output voltage from an AC power outlet or a battery, a power supply control unit for generating battery level data based upon a battery voltage level signal from the power supply unit and a battery eject system management interrupt signal when the battery is ejected from said computer system, a central processing unit, and a hard disk drive supplied with an output voltage of the power supply unit and operated at one of a write through cache and a write back cache mode under control of said central processing unit;

determining whether a system management interrupt signal is invoked, when the power supply is provided to said computer system;

determining whether an invoked system management interrupt signal corresponds to a battery level check signal for detecting a charging level of the battery;

when the invoked system management interrupt signal corresponds to the battery level check signal, enabling a cache in the hard disk drive to operate in the write back mode;

when the invoked system management interrupt signal does not correspond to the battery level check signal, determining whether the invoked system management interrupt signal corresponds to a power off system management interrupt signal;

when the invoked system management interrupt signal corresponds to the power off system management interrupt signal, enabling the hard disk drive to write all data contained in the cache into the hard disk; and terminating the power supply to a computer system.

6. The method of claim 5, wherein the step of enabling the cache in the hard disk drive to operate in the write back mode including the steps of:

determining whether the battery is provided with the computer system;

determining whether the battery is available for a predetermined time period; and determining whether the cache in the hard disk drive is operated in the write back mode.

7. The method of claim 5, wherein said step of enabling the hard disk drive to write all data contained in the cache into the hard disk comprises steps of:

determining whether the cache in the hard disk drive is operated in the write back mode; and enabling the power supply control unit to generate a switch off signal for controlling the power supply to said computer system.

8. The method of claim 5, further comprising the step of:

when the invoked system management interrupt signal does not correspond the power off system management interrupt signal, determining whether the invoked system management interrupt signal corresponds to a battery eject system management interrupt signal representing battery separation from the computer system; and when the invoked system management interrupt signal corresponds to a battery eject system management interrupt signal, enabling the hard disk drive to write all data existed in the cache into the hard disk.

9. The method of claim 8, further disabling the hard disk drive to enter the write through mode from the write back mode, after all data existed in the cache is written into the hard disk.

10. A computer system having a power saving function for a hard disk drive, comprising:

a power supply unit for supplying various levels of voltages necessary for the computer system from one of a power outlet and a battery, and for generating a battery voltage level signal corresponding to a voltage level of the battery;

a first power switch positioned on the computer system, for producing one of a power on signal and a power off signal in response to manual depression of said first power switch;

a second power switch for enabling transmission of output voltages of the power supply unit in response to a switch control signal;

a power supply control unit for generating battery level data in response to the battery voltage level signal, generating the switch control signal in response to the power on signal, generating a power off system management interrupt signal in response to the power off signal, and for generating a battery eject system management interrupt signal when the battery is ejected from the battery and when the power supply unit is not supplied with the voltage level of the battery; and a central processing unit for generating a request signal to receive the battery level data from the power supply control unit for enabling a disk cache to operate in a write back mode when the battery level data indicates that the battery is available for use, and for controlling the power supply control unit to generate a switch off signal after writing all data contained in the disk cache into a hard disk is completed in response to the power off system management interrupt signal from the power supply control unit; and a hard disk drive supplied with one output voltage of the power supply unit and operated in one of a write through mode and a write back mode under the control of the central processing unit.

11. The computer system of claim 10, further comprised of the power supply unit comprising:

an AC/DC converter for transforming an alternating current received from said power outlet into a direct current output; and a DC/DC converter transforming one of the direct current output of the AC/DC converter and a battery power output from the battery into the various level of voltages.

12. The computer system of claim 10, further comprised of said second power switch comprising a plurality of power field-effect transistors each serving as a discrete switch, and each switch being turned on or off in response to the switch control signal output from the power control unit.

13. The computer system of claim 10, further comprised of said power supply control unit corresponding to an one chip microcomputer connected to said central processing unit via a system bus.

14. The computer system of claim 10, further comprised of said central processing unit performing, in response to the switch on signal generated by the power supply control unit, an initializing of power management for the hard disk drive after a Power On Self Test to determine whether the computer system is normal, and then performing a normal booting operation.

15. The computer system of claim 14, further comprised of said initializing operation including an initialization of a battery level check system management interrupt and a power off system management interrupt.

16. The computer system of claim 15, further comprised of said initializing operation further including an initialization of a battery eject system management interrupt representing the battery separation from the computer system.

17. A method of controlling a computer system having a system management interrupt function and a power saving function for a hard disk drive in which the computer system is supplied with DC output voltage from one of an AC power outlet and a battery, said method comprising the steps of:

determining whether a system management interrupt signal is invoked in the computer system upon activation of power supply;

determining whether an invoked system management interrupt signal corresponds to a battery level check signal for detecting a charging level of the battery;

when the invoked system management interrupt signal corresponds to the battery level check signal, enabling a cache in the hard disk drive to operate in the write back mode;

when the invoked system management interrupt signal does not correspond to the battery level check signal, determining whether the invoked system management interrupt signal corresponds to a power off system management interrupt signal;

when the invoked system management interrupt signal corresponds to the power off system management interrupt signal, enabling the hard disk drive to write all data contained in the cache into the hard disk;

alternatively when the invoked system management interrupt signal does not correspond to the power off system management interrupt signal, determining whether the invoked system management interrupt signal corresponds to a battery eject system management interrupt signal representing battery separation from the computer system;

when the invoked system management interrupt signal corresponds to a battery eject system management interrupt signal, enabling the hard disk drive to write all data existed in the cache into the hard disk;

disabling the hard disk drive to enter the write through mode from the write back mode, after all data existed in the cache is written into the hard disk; and switching off power supplied to the computer system.

18. The method of claim 17, wherein said step of enabling the cache in the hard disk drive to operate in the write back mode comprises steps of:

determining whether the battery is provided with the computer system;

determining whether the battery is available for use for a predetermined time period; and determining whether the cache in the hard disk drive is operated in the write back mode.

19. The method of claim 17, wherein said step of enabling the hard disk drive to write all data contained in the cache into the hard disk comprises steps of:

determining whether the cache in the hard disk drive is operated in the write back mode; and switching off the power supplied to the computer system.

20. The method of claim 17, further comprised of said computer system comprising a power supply unit for supplying the DC output voltage from one of said AC power outlet and said battery and a central processing unit for controlling the system management interrupt function and the power saving function for said hard disk drive, and said hard disk drive supplied with an output voltage of the power supply unit and operated at one of a write through cache and a write back cache mode under the control of said central processing unit.

* * * * *